(12) United States Patent
Hoelzl

(10) Patent No.: US 12,123,403 B2
(45) Date of Patent: Oct. 22, 2024

(54) NACELLE FOR A WIND TURBINE

(71) Applicant: Miba Gleitlager Austria GmbH, Laakirchen (AT)

(72) Inventor: Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 18/290,337

(22) PCT Filed: May 12, 2022

(86) PCT No.: PCT/AT2022/060167
§ 371 (c)(1),
(2) Date: Nov. 13, 2023

(87) PCT Pub. No.: WO2022/236356
PCT Pub. Date: Nov. 17, 2022

(65) Prior Publication Data
US 2024/0247643 A1  Jul. 25, 2024

(30) Foreign Application Priority Data

May 14, 2021 (AT) .............................. A 50374/2021

(51) Int. Cl.
*F03D 80/70* (2016.01)
(52) U.S. Cl.
CPC ........ *F03D 80/703* (2023.08); *F05B 2240/14* (2013.01); *F05B 2260/301* (2013.01)
(58) Field of Classification Search
CPC ................ F03D 80/70; F03D 80/703
See application file for complete search history.

(56) References Cited

U.S. PATENT DOCUMENTS

| 3,709,573 | A | 1/1973 | Orkin et al. |
| 9,371,822 | B2 | 6/2016 | Demtroder |
| | | (Continued) | |

FOREIGN PATENT DOCUMENTS

| DE | 10 2017 006 957 A1 | 1/2019 |
| EP | 2 003 334 A1 | 12/2008 |
| | (Continued) | |

OTHER PUBLICATIONS

International Search Report in PCT/AT2022/060167, mailed Sep. 1, 2022.

*Primary Examiner* — Christopher R Legendre
(74) *Attorney, Agent, or Firm* — Collard & Roe, P.C.

(57) ABSTRACT

A nacelle for a wind turbine includes: a nacelle housing; a rotor shaft; a rotor hub, arranged on the rotor shaft; a first rotor shaft bearing for bearing the rotor shaft on the nacelle housing; and a second rotor shaft bearing. The first rotor shaft bearing and the second rotor shaft bearing are arranged at an axial distance to one another and the first rotor shaft bearing is arranged closer to the rotor hub than the second rotor shaft bearing. The first rotor shaft bearing has a first sliding surface having an averaged first sliding surface diameter and the second rotor shaft bearing has a second sliding surface having an averaged second sliding surface diameter. The first sliding surface faces away from the rotor hub at least in some sections, wherein the first sliding surface and the second sliding surface face one another at least in a partial section.

14 Claims, 3 Drawing Sheets

(56) References Cited

U.S. PATENT DOCUMENTS

Figure 1:
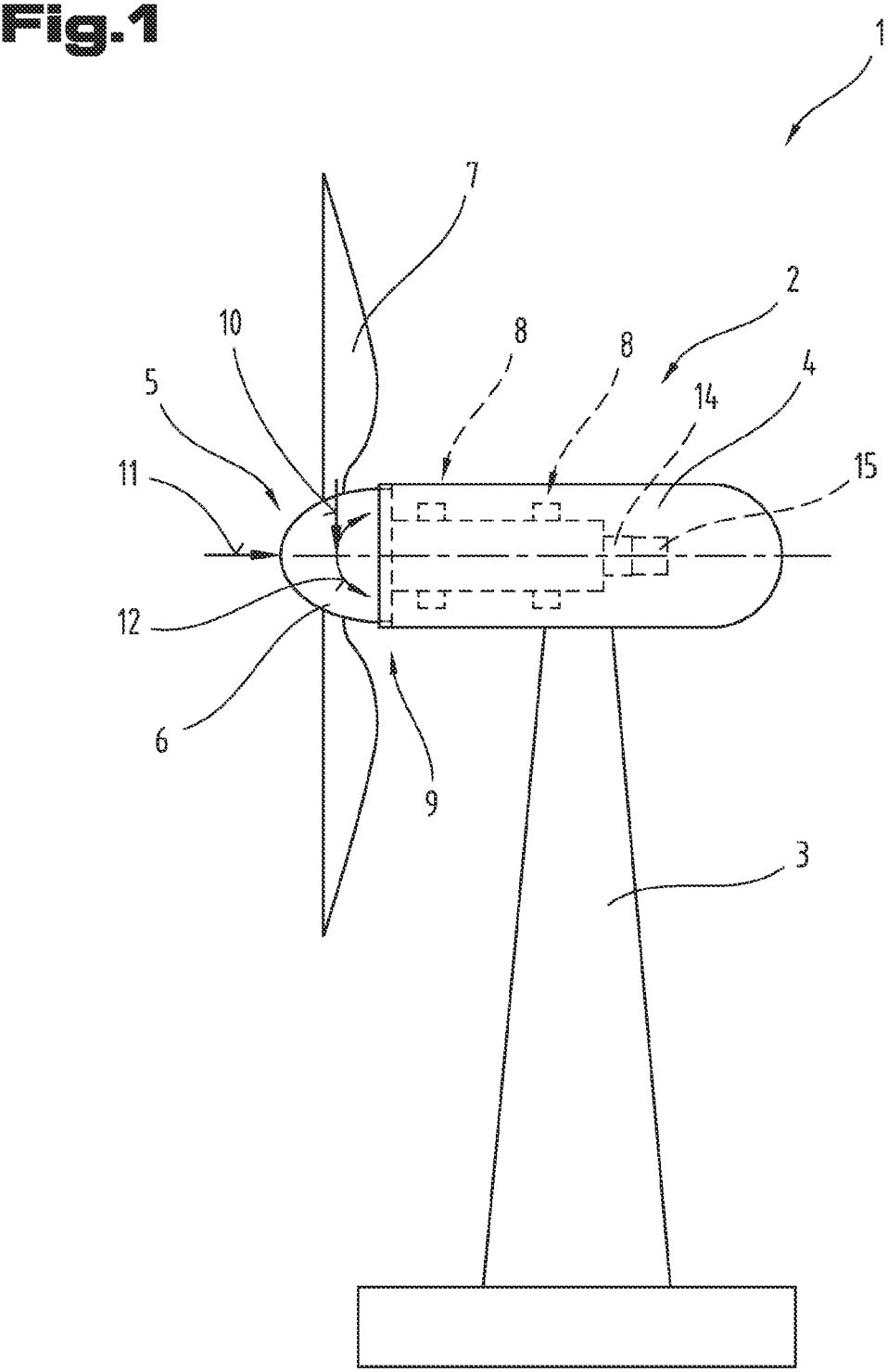

| | | | |
|---|---|---|---|
| 9,677,606 B2 | 6/2017 | Pischel | |
| 9,797,378 B2 * | 10/2017 | Pedersen | F16C 19/364 |
| 9,915,246 B2 * | 3/2018 | Wendeberg | F16C 19/547 |
| 10,054,109 B2 * | 8/2018 | Bitsch | F16C 19/548 |
| 10,598,214 B2 | 3/2020 | Hoelzl | |
| 11,441,547 B2 * | 9/2022 | Demissie | F03D 15/00 |
| 11,644,013 B2 | 5/2023 | Hoelzl | |
| 2019/0390658 A1 * | 12/2019 | Heuser | F16C 33/583 |
| 2020/0173425 A1 | 6/2020 | Schroeder | |
| 2024/0247643 A1 * | 7/2024 | Hoelzl | F16C 25/02 |

FOREIGN PATENT DOCUMENTS

| | | | |
|---|---|---|---|
| EP | 3 783 237 A1 | 2/2021 | |
| WO | 2012/041322 A2 | 4/2012 | |
| WO | 2015/091407 A2 | 6/2015 | |
| WO | 2018/071941 A1 | 4/2018 | |
| WO | 2018/095452 A1 | 5/2018 | |
| WO | WO-2020118329 A1 * | 6/2020 | F03D 80/50 |
| WO | 2020/232495 A1 | 11/2020 | |

* cited by examiner

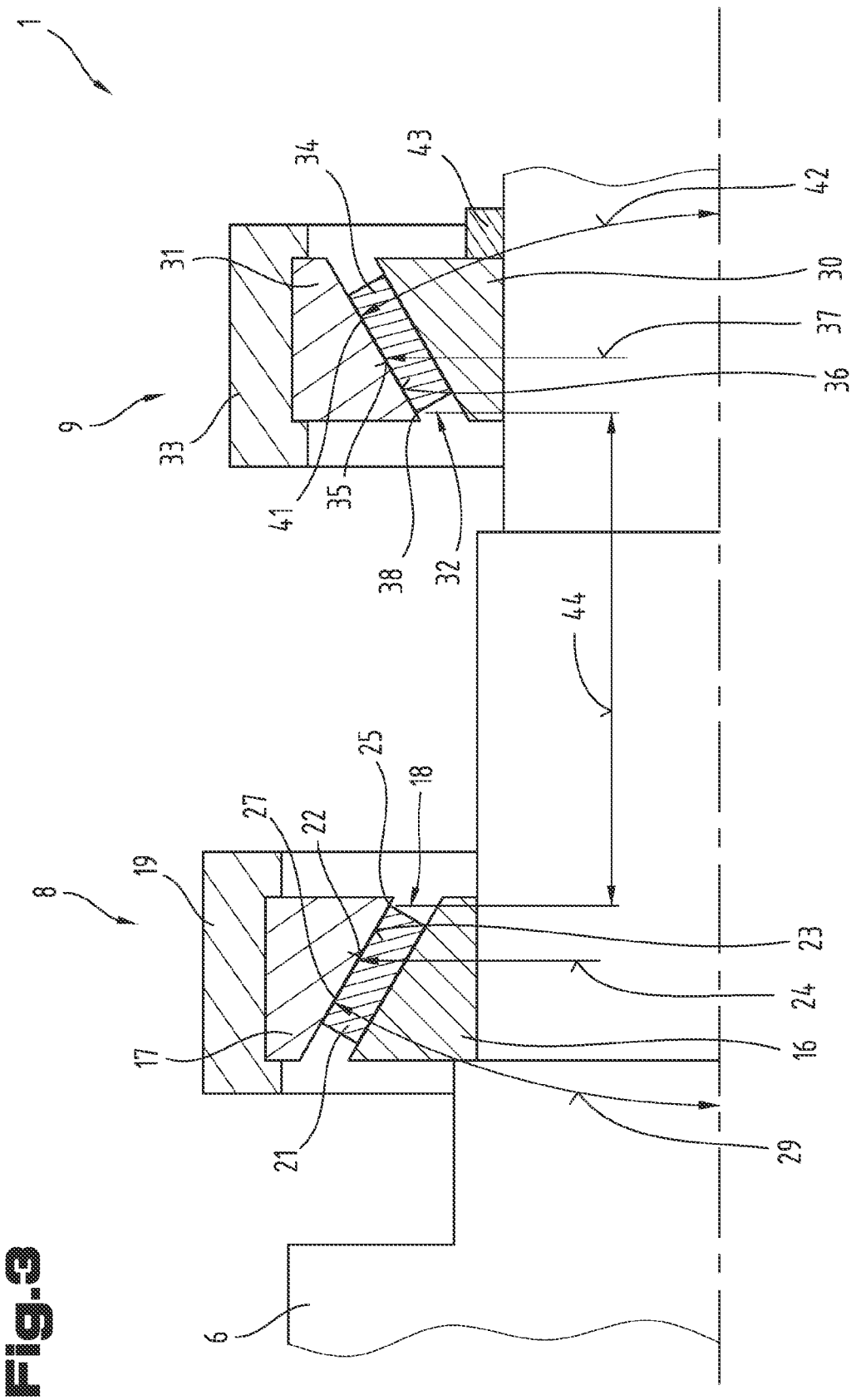

NACELLE FOR A WIND TURBINE

CROSS REFERENCE TO RELATED APPLICATIONS

This application is the National Stage of PCT/AT2022/060167 filed on May 12, 2022, which claims priority under 35 U.S.C. § 119 of Austrian Application No. A50374/2021 filed on May 14, 2021, the disclosure of which is incorporated by reference. The international application under PCT article 21 (2) was not published in English.

The invention relates to a nacelle for a wind turbine.

EP3783237A1 discloses a wind turbine having a nacelle with a nacelle housing, a rotor shaft, a rotor hub and a first and second rolling bearing for bearing the rotor shaft on the nacelle housing.

The wind turbine known from EP3783237A1 has the disadvantage that the bearing of the rotor shaft only insufficiently meets the high requirements in wind turbines.

It was the object of the present invention to overcome the shortcomings of the prior art and to provide a nacelle for a wind turbine which has an improved bearing.

This object is achieved by means of a device and a method according to the claims.

According to the invention, a nacelle for a wind turbine is formed. The nacelle comprises:
- a nacelle housing;
- a rotor shaft;
- a rotor hub, which is arranged on the rotor shaft;
- a first rotor shaft bearing for bearing the rotor shaft on the nacelle housing;
- a second rotor shaft bearing for bearing the rotor shaft on the nacelle housing, wherein the first rotor shaft bearing and the second rotor shaft bearing are arranged at an axial distance to one another and wherein the first rotor shaft bearing is arranged closer to the rotor hub than the second rotor shaft bearing.

The first rotor shaft bearing comprises a first sliding surface which has an averaged first sliding surface diameter. The second rotor shaft bearing comprises a sliding surface, which has an averaged second sliding surface diameter, wherein the first sliding surface faces away from the rotor hub at least in some sections, wherein the first sliding surface and the second sliding surface face one another at least in a partial section.

In particular, it may be provided that the first rotor shaft bearing and the second rotor shaft bearing are formed as separate sliding bearings.

The nacelle according to the invention entails the advantage that the first rotor shaft bearing and the second rotor shaft bearing are formed as sliding bearings. By the arrangement according to the invention of the first sliding surface and the second sliding surface with respect to one another and/or to the rotor hub, an axial load occurring due to the wind force and/or a tilting torque occurring due to the weight of the rotor hub can be absorbed or transmitted particularly efficiently. Thus, by the arrangement according to the invention, a surprisingly good suitability for the use in a nacelle of a wind turbine can be achieved. The fact that the first sliding surface usually faces away from the rotor hub in sections means that a tangent applied to the sliding surface is tilted away from the rotor hub at least at a certain point.

Furthermore, it may be expedient if the first sliding surface has an averaged first sliding surface diameter and that the axial distance between the first rotor shaft bearing and the second rotor shaft bearing is measured from the innermost contact point of the first sliding surface to the innermost contact point of the second sliding surface, wherein the axial distance is between 20% and 1,000%, in particular between 50% and 500%, preferably between 90% and 300%, especially between 120% and 200% of the averaged first sliding surface diameter. The averaged first sliding surface diameter is the diameter which is on average of the surface integral over the first sliding surface. The innermost contact point of the first sliding surface and the innermost contact point of the second sliding surface are those points at which the respective sliding surface still contacts the respective counterface and which are arranged closest to each other.

Furthermore, it may be provided that the first sliding surface is conical and that the second sliding surface is conical, wherein the first sliding surface and the second sliding surface are arranged in a V-shape relative to each other. This entails the advantage that sliding surfaces formed in this way are easy to manufacture.

In an alternative embodiment, it may be provided that the first sliding surface is configured in the form of a first spherical cap and that the second sliding surface is configured in the form of a second spherical cap, wherein the first sliding surface forms a first spherical cap arc in longitudinal section and wherein the second sliding surface forms a second spherical cap arc in longitudinal section, wherein a first tangent in a first spherical cap arc center and a second tangent in a second spherical cap arc center are arranged in a V-shape relative to one another.

In particular, such a formation of the first sliding surface and the second sliding surface ensures good transmission of axial forces while simultaneously absorbing the radial forces and tilting torques applied by the rotor hub.

An embodiment is also advantageous according to which it can be provided that the first rotor shaft bearing has a first outer ring and that the second rotor shaft bearing has a second outer ring, and that the first rotor shaft bearing has a first inner ring and that the second rotor shaft bearing has a second inner ring, wherein the first sliding surface is arranged between the first outer ring and the first inner ring and wherein the second sliding surface is arranged between the second outer ring and the second inner ring, wherein the first outer ring and the second outer ring are arranged fixed to one another in their position and wherein the first inner ring is arranged fixed to the rotor shaft in its position and wherein the second inner ring or a second sliding bearing element is pretensioned in the axial direction towards the first inner ring by means of a tensioning means, wherein the tensioning means acts between the second inner ring and the rotor shaft. In particular, such a formation of the first sliding surface and the second sliding surface ensures good transmission of axial forces while simultaneously absorbing the radial forces and tilting torques applied by the rotor hub.

In an alternative embodiment variant, it is also conceivable that the two inner rings are arranged at a fixed distance from each other in their axial position. For axial pretensioning, the two outer rings and/or the two bearing blocks can be displaced relative to each other. In particular, it is conceivable that the first bearing block is fixed and the second bearing block is displaced or clamped away from the first bearing block to pretension the bearing.

According to an advancement, it is possible for the tensioning means to take the form of a shaft nut. This entails the advantage that the two inner rings can be positioned precisely in relation to each other by means of a shaft nut in order to achieve the necessary pretensioning of the sliding bearing. It is also conceivable that the shaft nut is tightened with a predefined tightening torque in order to achieve a defined pretensioning.

It is also conceivable that a spring element is arranged between the tensioning means and the second inner ring and/or between the tensioning means and the second sliding bearing pads. This entails the advantage that the spring element can compensate for any thermal expansion and/or, to a lesser extent, wear.

Furthermore, it can be useful if a gearbox is formed which is torque-coupled to the rotor shaft, wherein the weight of the gearbox is at least partially absorbed by the second rotor shaft bearing. This entails the advantage that no separate bearing is required to support the gearbox.

Furthermore, it may be provided that the first rotor shaft bearing and/or the second rotor shaft bearing are configured to additionally support the weight of the generator. This entails the advantage that no separate bearing is required to support the generator.

Moreover, it can be provided that the first sliding surface and/or the second sliding surface are formed on sliding bearing pads. This entails the advantage that the sliding bearing pads can be easily inserted into the sliding bearing and are easy to change. Moreover, sliding bearing pads have a precise sliding surface and are easy to manufacture in an industrial process.

Furthermore, it can be provided that the averaged first sliding surface diameter is larger than the averaged second sliding surface diameter, in particular that the averaged second sliding surface diameter amounts to between 50% and 90%, preferably between 70% and 80%, of the averaged first sliding surface diameter. This entails the advantage that the first rotor shaft bearing, on which a higher axial force and a higher radial force occur in comparison to the second rotor shaft bearing, is dimensioned larger in accordance with this uneven force distribution, whereby an optimum force absorption can be achieved.

According to a particular embodiment, it is possible for the first outer ring to be accommodated in a first bearing block and the second outer ring to be accommodated in a second bearing block. This allows the first rotor shaft bearing and the second rotor shaft bearing to be formed separately and independently of each other.

Furthermore, it can be provided that the second bearing block is integrated into a gearbox.

It is also conceivable that the first rotor shaft bearing and the second rotor shaft bearing are formed as hydrodynamic sliding bearings. Alternatively, it is also conceivable that the first rotor shaft bearing and the second rotor shaft bearing are formed as hydrostatic sliding bearings. A separate lubricating oil pump can be provided in each case to supply the first rotor shaft bearing and the second rotor shaft bearing with lubricating oil. In an alternative embodiment variant, it is also conceivable that the first rotor shaft bearing and the second rotor shaft bearing are supplied with lubricating oil by means of a common lubricating oil pump.

For the purpose of better understanding of the invention, it will be elucidated in more detail by means of the figures below.

Figure 2:
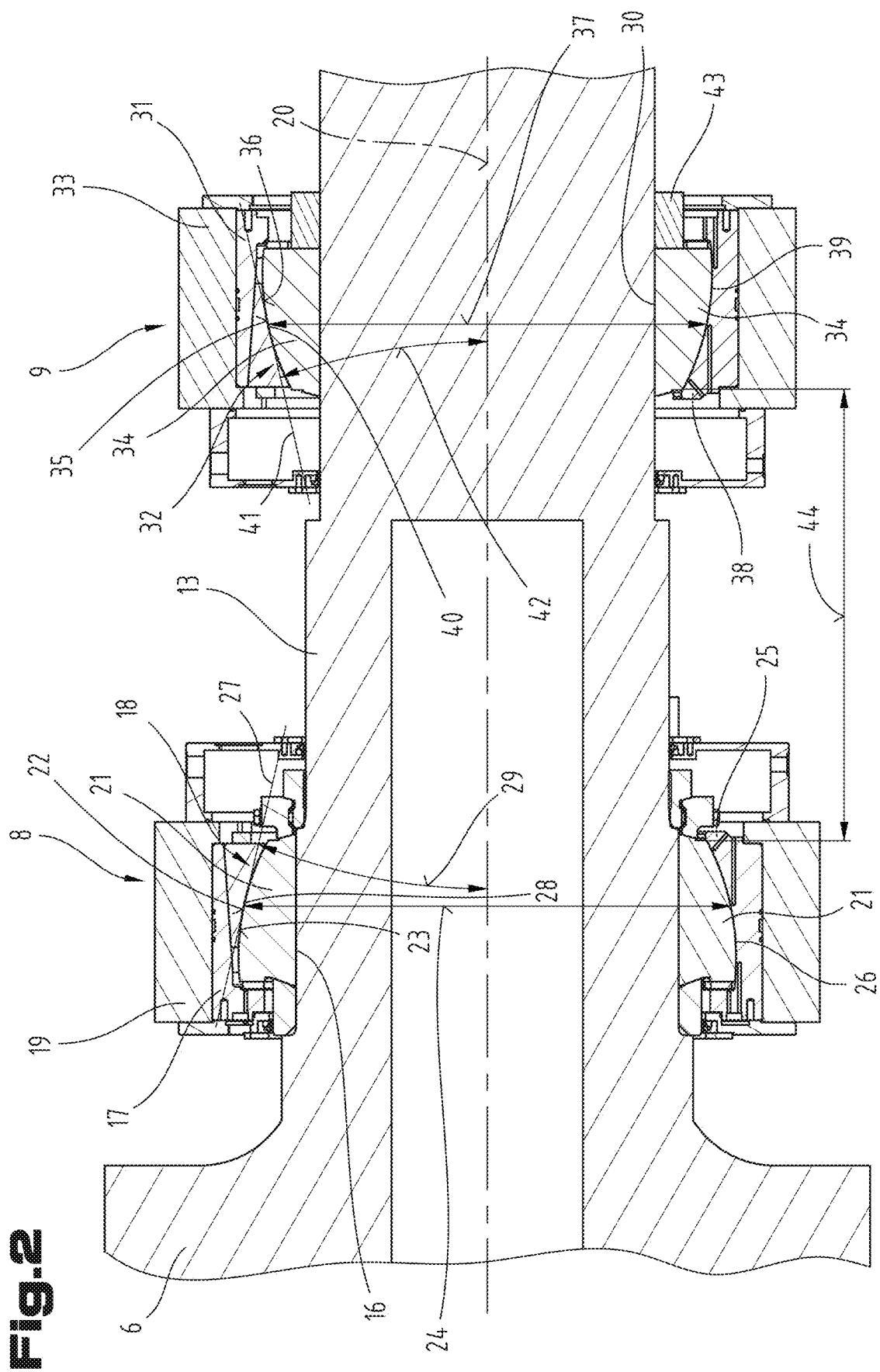

These show in a respectively very simplified schematic representation:

FIG. 1 a schematic representation of a wind turbine;

FIG. 2 a longitudinal section of a first exemplary embodiment of the sliding bearing;

FIG. 3 a longitudinal section of a second exemplary embodiment of the sliding bearing.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows, in a schematic view, a first exemplary embodiment of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 can be rotatably mounted on the nacelle housing 4 by means of a first rotor shaft bearing 8 and a second rotor shaft bearing 9. In particular, it may be provided that the rotor hub 6 is arranged on a rotor shaft 13, wherein the rotor shaft 13 is supported by means of the first rotor shaft bearing 8 and the second rotor shaft bearing 9.

The first rotor shaft bearing 8 and the second rotor shaft bearing 9 can be configured to absorb a radial force 10 and an axial force 11. The axial force 11 is caused by the force of the wind.

The radial force 10 is caused by the weight force of the rotor 5 and is effective at the center of gravity of the rotor 5. As the center of gravity of the rotor 5 is outside the first rotor shaft bearing 8, the radial force 10 causes a tilting torque 12 in the rotor shaft 13, which can be absorbed by the first rotor shaft bearing 8 and the second rotor shaft bearing 9. The tilting torque 12 may also be caused by an uneven load of the rotor blades 7.

Furthermore, it may be provided that a gearbox 14 is formed which is coupled to the rotor shaft 13. The gearbox 14 can be coupled to the rotor shaft 13 in such a way that it is also supported by the first rotor shaft bearing 8 and the second rotor shaft bearing 9.

Furthermore, it may be provided that a generator 15 is formed which is coupled to the gearbox 14.

As can also be seen from FIG. 1, it may be provided that the first rotor shaft bearing 8 is arranged closer to the rotor hub 6 than the second rotor shaft bearing 9.

It can further be provided that the second rotor shaft bearing 9 is arranged closer to the generator 15 than the first rotor shaft bearing 8. It can further be provided that the first rotor shaft bearing 8 and/or the second rotor shaft bearing 9 are formed to additionally support the weight of the generator 15.

FIG. 2 shows a first exemplary embodiment of the first rotor shaft bearing 8 and second rotor shaft bearing 9 installed in the nacelle 2 in a longitudinal sectional view.

As can be seen from FIG. 2, it may be provided that the first rotor shaft bearing 8 has a first inner ring 16 and a first outer ring 17. A first sliding bearing element 18 can be arranged between the first inner ring 16 and the first outer ring 17, which first sliding bearing element 18 is used for the rotational sliding bearing of the first inner ring 16 relative to the first outer ring 17.

In the exemplary embodiment shown in FIG. 2, the first inner ring 16 can be formed directly on the rotor shaft 13. It is also conceivable that the first inner ring 16 is formed as an independent component which is mounted on the rotor shaft 13.

Furthermore, it may be provided that the first outer ring 17 is accommodated in a first bearing block 19. In particular, it may be provided that the first bearing block 19 is coupled to the nacelle housing 4 or, alternatively, is formed directly in the nacelle housing 4. In this exemplary embodiment, it can thus be provided that the first outer ring 17 is rigidly coupled to the nacelle housing 4 and the first inner ring 16 is rotatable relative to the first outer ring 17 with respect to an axis of rotation 20 by means of the first sliding bearing element 18.

Furthermore, it may be provided that the first bearing block 19 serves directly as the first outer ring 17.

Furthermore, it may be provided that the first sliding bearing element 18 comprises a plurality of individual first sliding bearing pads 21, which are arranged distributed over the circumference between the first inner ring 16 and the first outer ring 17.

In the operating state, the individual first sliding bearing pads 21 can be firmly coupled to the first inner ring 16 and thus rotate with it relative to the first outer ring 17. In order to enable the rotary movement between the first inner ring 16 and the first outer ring 17, a first sliding surface 22 is formed on each of the individual first sliding bearing pads 21, which bears against a first counterface 23 of the first outer ring 17. The first counterface 23 can be arranged on an inner side of the first outer ring 17.

The first sliding surface 22 of the first sliding bearing pad 21 and the first counterface 23 of the first outer ring 17 are formed as sliding surfaces which slide against each other during operation of the wind turbine 1.

In particular, it may be provided that the first counterface 23 of the first outer ring 17 is formed as a hard, wear-resistant surface, which can be formed, for example, by a hardened steel. The first sliding surface 22 of the first sliding bearing pad 21 can be formed from a sliding bearing material that is soft in comparison to the first counterface 23. Of course, it is also conceivable that the first sliding surface 22 has a sliding coating.

As can be seen particularly clearly from FIG. 2, it may be provided that the individual first sliding bearing pads 21 each have a first sliding surface 22 that is curved when viewed in the axial direction.

Furthermore, it may be provided that the first sliding surface 22 has an averaged first sliding surface diameter 24. The averaged first sliding surface diameter 24 is the diameter average of the diameters of the first sliding surface 22 over the entire length of the sliding surface 22.

The first sliding surface 22 has an innermost contact point 25. The innermost contact point 25 of the first sliding surface 22 is that point of the first sliding surface 22 at which the first counterface 23 still contacts the first sliding surface 22 and which is arranged closest to the second rotor shaft bearing 9.

As can further be seen from FIG. 2, it may be provided that the first sliding surface 22 of the first sliding bearing pad 21 is formed as a spherical cap. In particular, it may be provided that the first sliding surface 22 forms a first spherical cap arc 26 in longitudinal section.

A first tangent 27 to the first sliding surface 22 in a first spherical cap arc center 28 can be arranged at a first angle 29 to the axis of rotation 20.

As shown in FIG. 2, it can be provided that the second rotor shaft bearing 9 comprises a second inner ring 30 and a second outer ring 31. A second sliding bearing element 32, which serves for the rotational sliding bearing of the second inner ring 30 relative to the second outer ring 31, can be arranged between the second inner ring 30 and the second outer ring 31.

In the exemplary embodiment shown in FIG. 2, the second inner ring 30 can be formed directly on the rotor shaft 13. It is also conceivable that the second inner ring 30 is formed as an independent component which is mounted on the rotor shaft 13.

Furthermore, it may be provided that the second ring 31 is accommodated in a second bearing block 33. In particular, it may be provided that the second bearing block 33 is coupled to the nacelle housing 4 or, alternatively, is formed directly in the nacelle housing 4. In this exemplary embodiment, it can thus be provided that the second outer ring 31 is rigidly coupled to the nacelle housing 4 and the second inner ring 30 is rotatable relative to the second outer ring 31 with respect to an axis of rotation 20 by means of the second sliding bearing element 32.

Furthermore, it may be provided that the second bearing block 33 serves directly as the second outer ring 31.

Furthermore, it may be provided that the second sliding bearing element 32 comprises a plurality of individual second sliding bearing pads 34, which are arranged distributed over the circumference between the second inner ring 30 and the second outer ring 31.

In the operating state, the individual second sliding bearing pads 34 can be firmly coupled to the second inner ring 30 and thus rotate with it relative to the second outer ring 31. In order to enable the rotary movement between the second inner ring 30 and the second outer ring 31, a second sliding surface 35 is formed on each of the individual second sliding bearing pads 34, which bears against a second counterface 36 of the second outer ring 31. The second counterface 36 can be arranged on an inner side of the second outer ring 31.

The second sliding surface 35 of the second sliding bearing pad 34 and the second counterface 36 of the second outer ring 31 are formed as sliding surfaces which slide against each other during operation of the wind turbine 1.

In particular, it may be provided that the second counterface 36 of the second outer ring 31 is formed as a hard, wear-resistant surface, which can be formed, for example, by a hardened steel. The second sliding surface 35 of the second sliding bearing pad 34 can be formed from a sliding bearing material that is soft in comparison to the second counterface 36. Of course, it is also conceivable that the second sliding surface 35 has a sliding coating.

As can be seen particularly clearly from FIG. 2, it may be provided that the individual second sliding bearing pads 34 each have a second sliding surface 35 that is curved when viewed in the axial direction.

Furthermore, it may be provided that the second sliding surface 35 has an averaged second sliding surface diameter 37. The averaged second sliding surface diameter 37 is the diameter average of the diameters of the second sliding surface 35 over the entire length of the second sliding surface 35.

The second sliding surface 35 has an innermost contact point 38. The innermost contact point 38 of the second sliding surface 35 is that point of the second sliding surface 35 at which the second counterface 36 still contacts the second sliding surface 35 and which is arranged closest to the first rotor shaft bearing 8.

As can further be seen from FIG. 2, it may be provided that the second sliding surface 35 of the second sliding bearing pad 34 is formed as a spherical cap. In particular, it may be provided that the second sliding surface 35 forms a second spherical cap arc 39 in longitudinal section.

A second tangent 41 to the second sliding surface 35 in a second spherical cap arc center 40 can be arranged at a second angle 42 to the axis of rotation 20.

As can further be seen from FIG. 2, it can be provided that the first tangent 27 and the second tangent 41 are arranged in a V-shape relative to each other. In other words, it can be provided that the first angle 29 is measured on the side of the rotor hub 6. The second angle 42 can be measured on the side facing away from the rotor hub. It is also conceivable that the first angle 29 and the second angle 42 are the same size, wherein the V-shaped arrangement results from the different side of the measurement.

It can also be provided that the second sliding bearing pads 34 are pretensioned in the axial direction towards the first rotor shaft bearing 8 by means of a tensioning means 43. The structure described and/or the pretensioning by means of the tensioning means 43 results in an O-shaped arrangement of the first rotor shaft bearing 8 and the second rotor shaft bearing 9, whereby radial forces, axial forces and tilting moments can be absorbed.

As can further be seen from FIG. 2, it can be provided that the innermost contact point 25 of the first sliding surface 22 and the innermost contact point 38 of the second sliding surface 35 are arranged at an axial distance 44 from each other.

In a further exemplary embodiment not shown, it can of course also be provided that the first inner ring 16 and the second inner ring 30 are formed as independent components. In such an exemplary embodiment, it may be provided that the tensioning means 43 acts directly on the second inner ring 30.

FIG. 3 shows a further exemplary embodiment of the first rotor shaft bearing 8 and/or the second rotor shaft bearing 9 of the wind turbine 1. As can be seen from FIG. 3, it can be provided that the first sliding surface 22 and/or the second sliding surface 35 are conical. In the longitudinal sectional view, the first sliding surface 22 and the second sliding surface 35 are thus shown as a straight line. As can also be seen from FIG. 3, it can also be provided that the first sliding surface 22 and the second sliding surface 35 are V-shaped in relation to each other. In particular, it may be provided that the first sliding surface 22 and the second sliding surface 35 face each other.

As can also be seen from FIG. 3, it can be provided that the tensioning means 43 is pressed directly against the second inner ring 30 and/or acts on the second inner ring 30.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

| List of reference numbers |
| --- |
| 1 Wind turbine |
| 2 Nacelle |
| 3 Tower |
| 4 Nacelle housing |
| 5 Rotor |
| 6 Rotor hub |
| 7 Rotor blade |
| 8 First rotor shaft bearing |
| 9 Second rotor shaft bearing |
| 10 Radial force |
| 11 Axial force |
| 12 Tilting torque |
| 13 Rotor shaft |
| 14 Gearbox |
| 15 Generator |
| 16 First inner ring |
| 17 First outer ring |
| 18 First sliding bearing element |
| 19 First bearing block |
| 20 Axis of rotation |
| 21 First sliding bearing pad |
| 22 First sliding surface |
| 23 First counterface |
| 24 Averaged first sliding surface diameter |
| 25 Innermost contact point of first sliding surface |
| 26 First spherical cap arc |
| 27 First tangent |
| 28 First spherical cap arc center |
| 29 First angle |
| 30 Second inner ring |
| 31 Second outer ring |
| 32 Second sliding bearing element |
| 33 Second bearing block |
| 34 Second sliding bearing pad |
| 35 Second sliding surface |
| 36 Second counterface |
| 37 Averaged second sliding surface diameter |
| 38 Innermost contact point of second sliding surface |
| 39 Second spherical cap arc |
| 40 Second spherical cap arc center |
| 41 Second tangent |
| 42 Second angle |
| 43 Tensioning means |
| 44 Axial distance |

The invention claimed is:

1. A nacelle for a wind turbine, the nacelle comprising:
a nacelle housing;
a rotor shaft;
a rotor hub, which is arranged on the rotor shaft;
a first rotor shaft bearing for bearing the rotor shaft on the nacelle housing;
a second rotor shaft bearing for bearing the rotor shaft on the nacelle housing,
wherein the first rotor shaft bearing and the second rotor shaft bearing are arranged at an axial distance to one another and wherein the first rotor shaft bearing is arranged closer to the rotor hub than the second rotor shaft bearing;
wherein the first rotor shaft bearing has a first sliding surface, which has an averaged first sliding surface diameter, and wherein the second rotor shaft bearing has a second sliding surface, which has an averaged second sliding surface diameter, wherein the first sliding surface faces away from the rotor hub at least in some sections, wherein the first sliding surface and the second sliding surface face one another at least in a partial section;

wherein a first inner ring is part of the rotor shaft and a first sliding bearing element is arranged between the first inner ring and a first outer ring and the first sliding bearing element comprises a plurality of individual first sliding bearing pads distributed over a first circumference between the first inner ring and the first outer ring, and in an operating state, the individual first sliding bearing pads are coupled to the first inner ring and rotate with the first inner ring relative to the first outer ring;

wherein a second inner ring is part of the rotor shaft and a second sliding bearing element is arranged between the second inner ring and a second outer ring and the second sliding bearing element comprises a plurality of individual second sliding bearing pads distributed over a second circumference between the second inner ring and the second outer ring and in the operating state, the individual second sliding bearing pads are coupled to the second inner ring and rotate with the second inner ring relative to the second outer ring.

2. The nacelle according to claim 1, wherein the axial distance between the first rotor shaft bearing and the second rotor shaft bearing is measured from an innermost contact point of the first sliding surface to an innermost contact point of the second sliding surface, wherein the axial distance is between 20% and 1,000% of the averaged first sliding surface diameter.

3. The nacelle according to claim 2, wherein the axial distance is between 50% and 500% of the averaged first sliding surface diameter.

4. The nacelle according to claim 2, wherein the axial distance is between 90% and 300% of the averaged first sliding surface diameter.

5. The nacelle according to claim 2, wherein the axial distance is between 120% and 200% of the averaged first sliding surface diameter.

6. The nacelle according to claim 1, wherein the first sliding surface is conical and wherein the second sliding surface is conical, wherein an imaginary extension line of the first sliding surface and an imaginary extension line of the second sliding surface intersect and combine to form a V-shape.

7. The nacelle according to claim 1, wherein the first sliding surface is configured in the form of a first spherical cap and wherein the second sliding surface is configured in the form of a second spherical cap, wherein the first sliding surface forms a first spherical cap arc in longitudinal section and wherein the second sliding surface forms a second spherical cap arc in longitudinal section, wherein an imaginary extension line of a first tangent to a first spherical cap arc center and an imaginary extension line of a second tangent to a second spherical cap arc center intersect and combine to form a V-shape.

8. The nacelle according to claim 1, further comprising a gearbox torque-coupled to the rotor shaft, wherein the weight of the gearbox is at least partially carried by the second rotor shaft bearing.

9. The nacelle according to claim 1, wherein the averaged first sliding surface diameter is larger than the averaged second sliding surface diameter.

10. The nacelle according to claim 9, wherein the averaged second sliding surface diameter amounts to between 50% and 90% of the averaged first sliding surface diameter.

11. The nacelle according to claim 9, wherein the averaged second sliding surface diameter amounts to between 70% and 80% of the averaged first sliding surface diameter.

12. A nacelle for a wind turbine, the nacelle comprising:
a nacelle housing;
a rotor shaft;
a rotor hub, which is arranged on the rotor shaft;
a first rotor shaft bearing for bearing the rotor shaft on the nacelle housing;
a second rotor shaft bearing for bearing the rotor shaft on the nacelle housing,
wherein the first rotor shaft bearing and the second rotor shaft bearing are arranged at an axial distance to one another and wherein the first rotor shaft bearing is arranged closer to the rotor hub than the second rotor shaft bearing;
wherein the first rotor shaft bearing has a first outer ring and wherein the second rotor shaft bearing has a second outer ring, and wherein the first rotor shaft bearing has a first inner ring and wherein the second rotor shaft bearing has a second inner ring,
wherein a first sliding surface is arranged between the first outer ring and the first inner ring on first sliding bearing pads, and
wherein a second sliding surface is arranged between the second outer ring and the second inner ring on second sliding bearing pads, wherein in an operating state, the second sliding bearing pads are coupled to the second inner ring and rotate with the second inner ring relative to the second outer ring, wherein the first outer ring and the second outer ring are arranged fixed to one another in their position and wherein the first inner ring is arranged fixed to the rotor shaft in its position and wherein the second inner ring carrying the second bearing pads or a second sliding bearing element comprising the second sliding bearing pads is pretensioned in the axial direction towards the first inner ring by means of a tensioning means.

13. The nacelle according to claim 12, wherein the tensioning means takes the form of a shaft nut.

14. The nacelle according to claim 12, wherein the first outer ring is accommodated in a first bearing block and the second outer ring is accommodated in a second bearing block.

* * * * *